(No Model.)
J. E. BALL.
ATTACHMENT FOR PLOWS.
No. 605,172.                    Patented June 7, 1898.
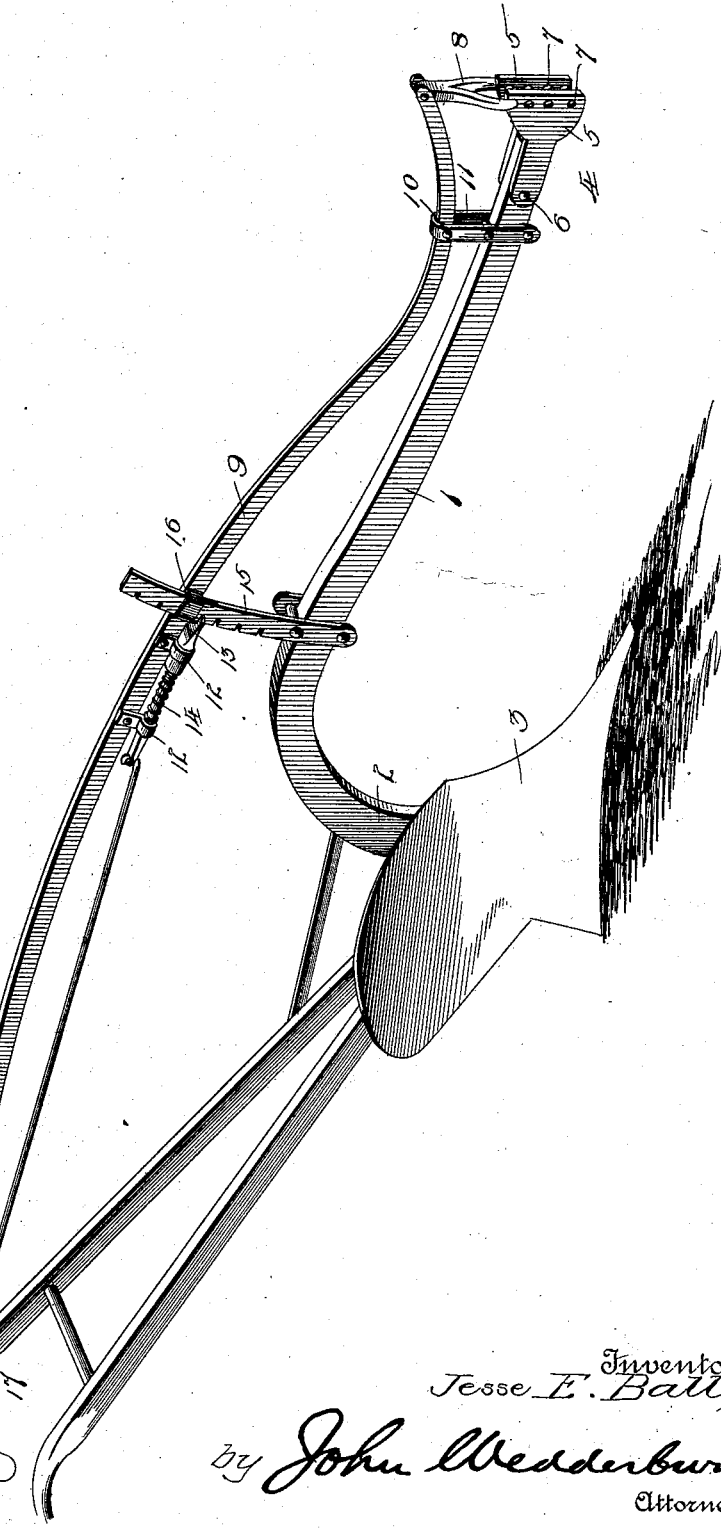
Witnesses
T. L. McKabe
Victor J. Evans
Inventor
Jesse E. Ball,
by John Wedderburn
Attorney

UNITED STATES PATENT OFFICE.

JESSE E. BALL, OF KENDRICK, IDAHO.

ATTACHMENT FOR PLOWS.

SPECIFICATION forming part of Letters Patent No. 605,172, dated June 7, 1898.

Application filed June 21, 1897. Serial No. 641,679. (No model.)

*To all whom it may concern:*

Be it known that I, JESSE E. BALL, of Kendrick, in the county of Latah and State of Idaho, have invented certain new and useful Improvements in Attachments for Plows; and I do hereby declare the following to be a full, clear, and exact description of the invention, such as will enable others skilled in the art to which it appertains to make and use the same.

This invention relates to improvements in attachments for walking plows or cultivators, the object of the same being to provide a device for regulating the draft to change its point of application, and consequently the depth at which the plow will enter the ground.

To these ends the invention consists in providing the plow with a clevis pivoted to the forward end of the plow-beam, a lever fulcrumed in a bracket attached to the plow-beam and connected to the pivoted clevis, and means for holding the lever in an adjusted position comprising a sliding dog carried by the lever and a toothed segment secured to the plow-beam for engagement by the said sliding dog, all as fully set forth in detail in the following specification and the novel features of construction particularly recited in the appended claim.

In the accompanying drawing, forming part of this specification, the figure is a perspective view showing the application of my invention.

Referring to the drawing by numerals, 1 designates the plow-beam, which is curved at its rear end to form the standard 2, to which a mold-form or a turn-plow 3 is secured in the usual manner. To the forward end of the plow-beam is pivoted a clevis 4, consisting of the side plates 5 5, through which the transverse bearing-pin 6 is passed, the outer ends of said side plates having a vertical series of holes 7, to which the draft appliance is adjustably connected. The plates 5 5, which form the clevis, are connected to each other at their forward ends by a bifurcated bar 8, that is extended upward to form a connection, as hereinafter mentioned.

9 designates a lever which is curved, as shown, and is pivoted near its forward end upon a transverse bearing-pin 10, supported by a bracket 11, which is clamped to the plow-beam, the rear end of the lever extending to a point, so as to be conveniently operated by the plowman. The bracket 11 is formed by a looped plate, the members of which straddle the plow-beam and are clamped thereto by the bolts, which connect the plates and bear against the upper and lower edges of the beam. At its forward end the lever is pivotally connected to the upper end of the bifurcated bar 8, which is connected to the clevis in swinging engagement with the plates forming said clevis. It will be noted that by this manner of pivoting the lever and connecting the same to the clevis the forward end of the latter can be raised and lowered to change the application of the draft and cause the plow to enter the ground to a more or less extent, and in order to provide for locking the lever in an adjusted position I have provided the same with certain devices for the purpose which I shall now proceed to describe. To one side of the lever is attached loops 12 12, in which is mounted a sliding bar or dog 13, normally projected by a helical spring 14, interposed between a shoulder on the bar and one of the loops or brackets supporting the same. This sliding bar or dog is adapted to engage a toothed segment 15, projecting upward from the plow-beam, to which it is bolted, the said segment passing through a metal strap 16, carried by the lever. The sliding bar or dog is retracted by means of a supplemental lever 17, pivoted near the rear end of the main lever and connected to the said sliding bar or dog by means of a rod, as shown. The lever 17 is bent and arranged so that when drawn toward the handle of the main lever it will retract the sliding bar or dog and when released will permit said bar or dog to engage the toothed segment. This attachment will provide for securely holding the lever in an adjusted position and permits of the said lever being readily and conveniently operated for changing the application of the draft of the plow.

From the foregoing description of the construction and operation of my attachment for plows and cultivators it will be readily apparent that the depth at which the plow will enter the ground can be readily changed or regulated without having to adjust the draft mechanism at the clevis.

This attachment is very cheap and simple in its construction, but possesses the more important advantage of being effective in operation.

Having thus described my invention, what I claim as new, and desire to secure by Letters Patent, is—

In combination with a plow or cultivator having a beam, of a clevis pivotally mounted on the front end of the said beam and consisting of opposite side plates connected to each other at their outer ends by a bifurcated bar extended upwardly to form a connection, a bracket supported by the said beam, a lever pivotally mounted in the said bracket and having its forward end attached to the said bifurcated bar of the clevis, a toothed segment over which the rear part of the said lever extends, and a sliding dog mounted on the rear portion of the lever and adapted to engage the toothed segment, the said lever being operated to elevate or depress the clevis and hold the latter in a predetermined adjusted position to regulate the depth of cut of the plowshare in its movement upwardly or downwardly over a hill by changing the draft.

In testimony whereof I have signed this specification in the presence of two subscribing witnesses.

JESSE E. BALL.

Witnesses:
R. M. WALKER,
CHAS. CARLSON.